US010921029B2

(12) United States Patent
Haack et al.

(10) Patent No.: US 10,921,029 B2
(45) Date of Patent: Feb. 16, 2021

(54) TEST CHAMBER

(71) Applicant: WEISS UMWELTTECHNIK GMBH, Reiskirchen (DE)

(72) Inventors: Christian Haack, Marburg (DE); Gerald Klee, Muecke (DE)

(73) Assignee: WEISS UMWELTTECHNIK GMBH, Reiskirchen (DE)

( * ) Notice: Subject to any disclaimer, the term of this patent is extended or adjusted under 35 U.S.C. 154(b) by 204 days.

(21) Appl. No.: 16/082,328

(22) PCT Filed: Mar. 13, 2017

(86) PCT No.: PCT/EP2017/055863
§ 371 (c)(1),
(2) Date: Sep. 5, 2018

(87) PCT Pub. No.: WO2017/157864
PCT Pub. Date: Sep. 21, 2017

(65) Prior Publication Data
US 2019/0093926 A1 Mar. 28, 2019

(30) Foreign Application Priority Data
Mar. 16, 2016 (DE) .................. 10 2016 204 378

(51) Int. Cl.
*F25B 9/00* (2006.01)
*C09K 5/04* (2006.01)
*F25B 7/00* (2006.01)
*G01N 1/42* (2006.01)

(52) U.S. Cl.
CPC .............. *F25B 9/006* (2013.01); *C09K 5/041* (2013.01); *C09K 5/042* (2013.01); *C09K 5/045* (2013.01);
(Continued)

(58) Field of Classification Search
CPC ........ C09K 2205/126; C09K 2205/128; C09K 2205/13; C09K 2205/24; C09K 2205/32;
(Continued)

(56) References Cited

U.S. PATENT DOCUMENTS 2,454,263 A * 11/1948 Newton .................. F25B 41/04
62/199
4,346,754 A 8/1982 Imig et al.
(Continued)

FOREIGN PATENT DOCUMENTS

| CN | 1065085 A | 10/1992 |
| CN | 101914368 A | 12/2010 |

(Continued)

OTHER PUBLICATIONS

English Abstract Translation of CN101914368A dated Dec. 15, 2010.
(Continued)

*Primary Examiner* — Francis C Gray
(74) *Attorney, Agent, or Firm* — King & Schickli, PLLC

(57) ABSTRACT

A test chamber (10) for conditioning air has a test space (12), and a temperature control device (11) for controlling the temperature of the test space and allowing a temperature in a range of −80° C. to +180° C., preferably −100° C. to +200° C., to be established within the test space, the temperature control device having a cooling device (16) with a cooling circuit (17), a heat exchanger (18), a compressor (19), a condenser (20), and an expansion element (21), wherein the refrigerant is a nearly azeotropic and/or zeotropic refrigerant mixture of a mass percentage of carbon dioxide and a mass percentage of at least one of the components ethane, ethene, hexafluoroethane, pentafluoroethane, monofluoro-ethane, 1,1-difluoroethene, fluoromethane and/or propane and/or xenon, the refrigerant having a relative CO2 equivalent of (Continued)

<3000, preferably <500, in particular preferably <10, with respect to 20 years.

21 Claims, 1 Drawing Sheet

(52) U.S. Cl.
CPC ............... *F25B 7/00* (2013.01); *F25B 9/008* (2013.01); *G01N 1/42* (2013.01); *C09K 2205/106* (2013.01); *C09K 2205/12* (2013.01); *C09K 2205/122* (2013.01); *C09K 2205/126* (2013.01); *C09K 2205/128* (2013.01); *C09K 2205/13* (2013.01); *C09K 2205/24* (2013.01); *C09K 2205/32* (2013.01); *C09K 2205/34* (2013.01); *F25B 2341/0661* (2013.01); *F25B 2400/0401* (2013.01); *F25B 2400/12* (2013.01)

(58) Field of Classification Search
CPC ........ C09K 5/041; C09K 5/042; C09K 5/045; G01N 1/42; F25B 2341/0661; F25B 2400/0401; F25B 2400/12; F25B 7/00; F25B 9/006; F25B 9/008
See application file for complete search history.

(56) References Cited

U.S. PATENT DOCUMENTS

| | | | |
|---|---|---|---|
| 4,724,679 A * | 2/1988 | Radermacher | F25B 25/02 62/101 |
| 5,351,499 A | 10/1994 | Takemasa | |
| 5,744,052 A | 4/1998 | Bivens | |
| 2004/0123608 A1* | 7/2004 | Kamimura | F25B 5/04 62/114 |
| 2016/0018135 A1* | 1/2016 | Yuzawa | F25B 7/00 62/175 |
| 2017/0058171 A1* | 3/2017 | Fukushima | F25B 1/00 |
| 2019/0161661 A1* | 5/2019 | Tasaka | C07C 17/383 |

FOREIGN PATENT DOCUMENTS

| | | |
|---|---|---|
| CN | 104379710 A | 2/2015 |
| CN | 204234107 U | 4/2015 |
| CN | 105164226 A | 12/2015 |
| DE | 4116274 A1 | 11/1992 |
| DE | 19654790 C1 | 7/1998 |
| DE | 102005014552 A1 | 9/2006 |
| DE | 102009010329 A1 | 8/2010 |
| DE | 102014104110 A1 | 10/2015 |
| EP | 3051227 A1 | 9/2014 |
| WO | 9707181 A1 | 2/1997 |

OTHER PUBLICATIONS

English Abstract Translation of CN104379710A dated Feb. 25, 2015.
English Abstract Translation of CN105164226A dated Dec. 16, 2015.

* cited by examiner

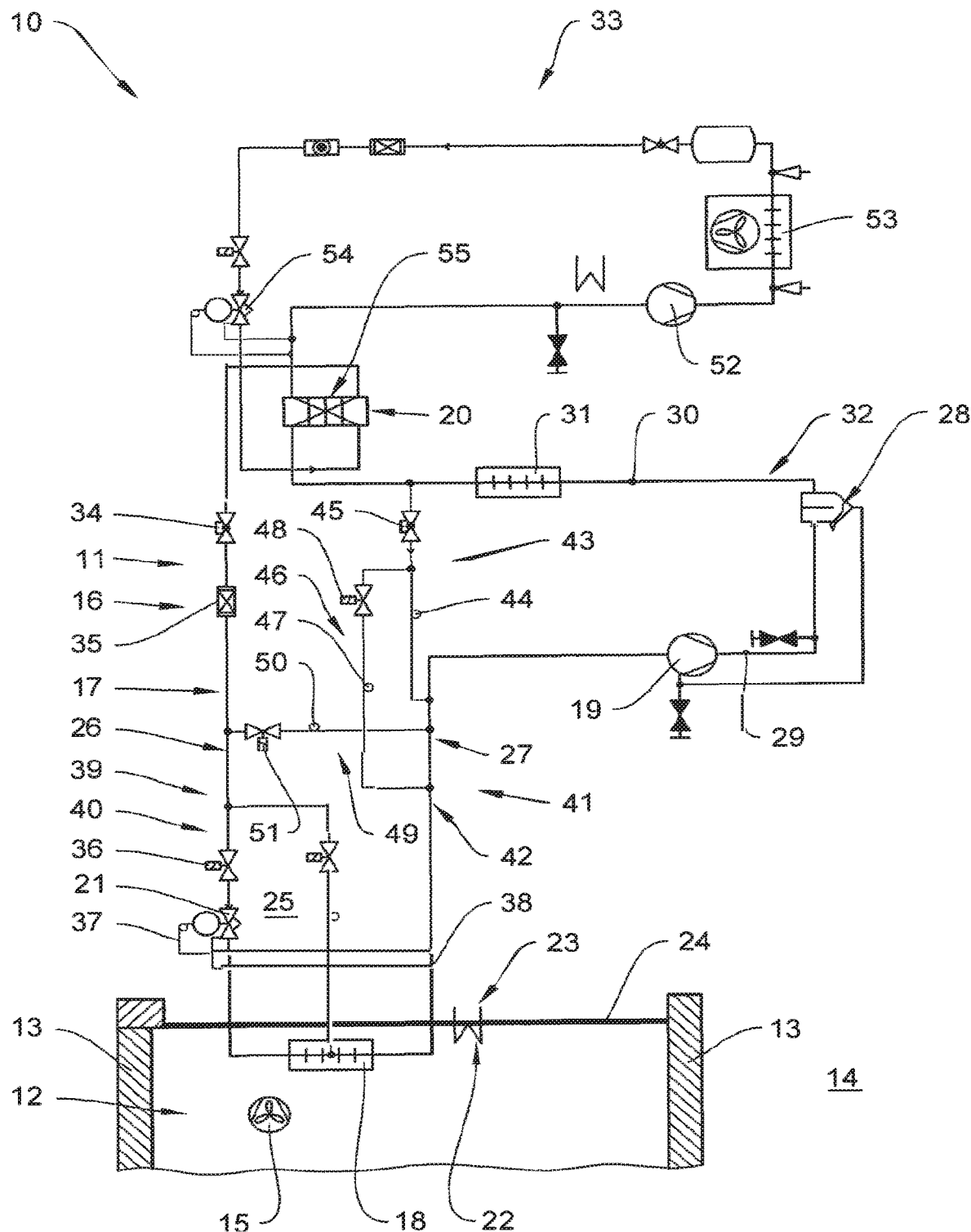

TEST CHAMBER

FIELD OF THE INVENTION

The invention relates to a test chamber for conditioning air, comprising a test space which serves to receive test material and which can be closed off from the surroundings and which is temperature-insulated, and a temperature control device for controlling the temperature of the test space, the temperature control device allowing a temperature in a temperature range of −80° C. to +180° C., preferably −100° C. to +200° C., to be established within the test space, the temperature control device having a cooling device comprising a cooling circuit with a refrigerant, a heat exchanger disposed in the test space, a compressor, a condenser, and an expansion element.

BACKGROUND OF THE INVENTION

Test chambers of this kind are typically used to test physical and/or chemical properties of objects and of devices, in particular. For instance, temperature test cabinets or climate test cabinets are known within which temperatures in a range of −50° C. to +180° C. can be established. In climate test cabinets, desired climatic conditions can additionally be established, to which the device or the test material is then exposed for a defined period of time. Test chambers of this kind are typically or partially configured as mobile devices, which are connected to a building merely via the required supply lines and comprise all modules required for temperature control and air conditioning. Temperature control of a test space holding the test material to be tested typically takes place in a circulating air duct within the test space. The circulating air duct forms an air treatment space within the test space, in which heat exchangers for heating or cooling the air flowing through the circulating air duct and through the test space are disposed. A fan or ventilator aspirates the air located in the test space and leads it to the respective heat exchangers in the circulating air duct. In this way, the test material can be temperature-controlled or can be exposed to a defined temperature change. During a test interval, a temperature may change between a maximum temperature and a minimum temperature of the test chamber, for example.

The refrigerant circulating in the cooling circuit has to be such that it can be used in the cooling circuit within the aforementioned temperature difference. As per legal provisions, the refrigerant must not significantly contribute to ozone depletion in the atmosphere or to global warming. Therefore, substantially no fluorinated gases or chlorinated substances may be used as refrigerants, which is why natural refrigerants and gases are worth considering. Moreover, the refrigerant should be nonflammable so as to not make filling, shipping and operation of the test chamber more difficult because of safety previsions that may have to be observed. Also, production of a test circuit becomes more expensive when a flammable refrigerant is used because of the constructive measures required in that case. In this context, flammability means that the refrigerant reacts with ambient oxygen, producing heat. A refrigerant is flammable in particular if it falls under fire class C according to European standard EN2.

Moreover, a refrigerant should have a relatively low $CO_2$ equivalent; i.e. a relative global warming potential (GWP) should be as low as possible so as to avoid indirect damage to the environment in case the refrigerant is released. The GWP is a measure of how much a defined mass of a greenhouse gas contributes to global warming, carbon dioxide serving as a reference value. Said value describes the mean warming effect over a specific time interval, 20 years being set in this context for the sake of comparability. Regarding the definition of the relative $CO_2$ equivalent or GWP, reference is made to the Fifth Assessment Report of the Intergovernmental Panel on Climate Change (IPCC), Appendix 8.A, Table 8.A.1.

However, carbon dioxide is not a very suitable refrigerant for the temperature range intended for a test chamber because carbon dioxide having its triple point at −56.6° C. makes using pure carbon dioxide at temperatures below −55° C. impossible. Mixtures of carbon dioxide and dinitrogen monoxide, for example, can be used as refrigerants at up to −70° C.; however, dinitrogen monoxide damages the ozone layer.

SUMMARY OF THE INVENTION

Therefore, the object of the present invention is to provide a test chamber by means of which temperatures of up to at least −80° C. can be achieved, wherein the test chamber is supposed to be safe and environmentally friendly without additional production costs.

Said object is attained by a test chamber having the features of claim 1.

The test chamber for conditioning air according to the invention comprises a test space which serves to receive test material and which can be closed off from the surroundings and which is temperature-insulated, and a temperature control device for controlling the temperature of the test space, the temperature control device allowing a temperature in a temperature range of −80° C. to +180° C., preferably −100° C. to +200° C., to be established within the test space, the temperature control device having a cooling device comprising a cooling circuit with a refrigerant, a heat exchanger disposed in the test space, a compressor, a condenser, and an expansion element, wherein the refrigerant is a nearly azeotropic and/or zeotropic refrigerant mixture of a mass percentage of carbon dioxide and a mass percentage of at least one of the components ethane, ethene, hexafluoroethane, pentafluoroethane, monofluoroethane, 1,1-di-fluoroethene, fluoromethane and/or propane and/or xenon, the refrigerant having a relative $CO_2$ equivalent of <3000, <2500, preferably <500, in particular preferably <10, with respect to 20 years.

In the case of the test chamber according to the invention, a heat exchange with the surroundings of the test space is largely avoided by temperature-insulation of side walls, bottom walls, and ceiling walls. The heat exchanger of the cooling circuit is disposed within the test space or, more precisely, in an air treatment space of the test space, allowing air circulated by a fan to come into contact with the heat exchanger. In this way, it becomes possible for a circulated amount of air of the test space to be cooled by means of the cooling device via the heat exchanger in the test space. The heat exchanger, in turn, is connected to and integrated in the cooling circuit, which means that refrigerant circulating in the cooling circuit flows through the heat exchanger. The cooling device further comprises the compressor and the condenser for the compressed refrigerant, the condenser being disposed downstream of the compressor in the flow direction of the refrigerant. The compressed refrigerant, which is highly pressurized after having been compressed and which is substantially gaseous, condenses in the condenser, whereafter it is substantially in the liquid state. The liquid refrigerant flows across the expansion element, in the course of which it becomes gaseous again by expansion due to a pressure drop. While doing so, it flows through the heat exchanger, which is thus cooled. Thereafter, the gaseous refrigerant is aspirated and compressed by the compressor again. The term expansion element refers to an expansion valve, a throttle, a throttle valve or another suitable narrowing of a fluid duct.

It was found that carbon dioxide can be used with a mass percentage of the refrigerant if it is mixed with a mass percentage of at least one of the components ethane, ethene, hexafluoroethane, pentafluoroethane, monofluoroethane, 1,1-difluoroethene, fluoromethane and/or propane and/or xenon. This refrigerant mixture then behaves like an azeotropic and/or zeotropic refrigerant mixture. An azeotropic mixture is a fluid which consists of two or more substances and whose vapor phase has the same composition as the liquid phase. The azeotropic mixture has a clear boiling point, which is pressure-dependent, and behaves like a pure substance. Contrary to that, a zeotropic mixture is a fluid which consists of two or more substances and whose composition of the vapor phase and of the liquid phase is always different in terms of vapor-liquid equilibrium. The saturated vapor line and the saturated liquid line do not touch. Under constant pressure, the phase transition of zeotropic mixtures happens across a temperature range which is referred to as the temperature glide. In azeotropic mixtures, the saturated vapor line and the saturated liquid line touch in at least one point, i.e. the composition of the vapor phase and the composition of the liquid phase are the same in this point. The vapor pressure and the boiling temperature of a zeotropic mixture are always between the pure-substance vapor pressures and the pure-substance boiling temperatures, whereas in azeotropic mixtures, a maximum pressure and a minimum temperature or a minimum pressure and a maximum temperature occur that may be located outside of the range defined by the pure-substance values. On a high-pressure side of the cooling circuit, the refrigerant mixture can also be present in the form of a zeotropic refrigerant mixture as a function of one of the components of the refrigerant mixture when it is introduced into the condenser.

According to the invention, the refrigerant mixture allows the test chamber to be used in a temperature range of −80° C. to +100° C., the refrigerant mixture having a relative $CO_2$ equivalent of <2500 with respect to 20 years, thus causing little harm to the environment.

If the refrigerant is inflammable, a more cost-effective design becomes possible for the test chamber and the cooling circuit in particular because no safety precautions regarding flammability of the refrigerant have to be observed. At least, the refrigerant cannot be classified under fire class C and/or refrigerant safety group A1 in this case. Moreover, shipping and transport of the test chamber are simplified because the test chamber can be filled with the refrigerant prior to transport irrespective of the mode of transport. In the case of a flammable refrigerant, filling may not be possible until the test chamber is put into operation at the installation site. Furthermore, use of the nonflammable refrigerants is possible if sources of ignition are present in the test space. Sensors for detecting a flammable atmosphere in the vicinity of the heat exchanger within the test space are not required in this case. Sensors of this kind usually are not temperature-stable.

It is also advantageous if the refrigerant is soluble in refrigerator oil. The compressor can be disposed in an oil sump, which would allow oil to also be transported at least in sections of the cooling circuit. An oil separator via which oil is recycled to the compressor can be disposed in the cooling circuit in the flow direction of the refrigerant. The oil may be POE oils, PAG oils, PFPE oils or mineral oil.

The refrigerant may have a temperature glide of less than or equal to 20 K, preferably 5 K, in particular preferably 1 K. This may be the case if the refrigerant is a nearly azeotropic refrigerant mixture. The refrigerant does not have a temperature glide if it is a purely azeotropic refrigerant mixture. This means that the term nearly azeotropic refrigerant mixture refers to a refrigerant mixture having a temperature glide of less than or equal to 5 K, preferably 1 K. According to this definition, zeotropic refrigerant mixtures have a temperature glide of >20 K or >1 K.

A mass percentage of carbon dioxide can be 0.09 to 0.45 when mixed with ethene. If the refrigerant is a binary refrigerant mixture, it may behave completely azeotropically. In this case, the azeotropism favorably influences substantial refrigeration-related parameters. The refrigerant mixture can be handled like a one-substance refrigerant or a pure substance. A difference in concentration between the liquid phase and the vapor phase and the temperature glide of the isobaric evaporation or of the isobaric condensation are so small as to be negligible, which, in turn, is advantageous for design, construction, operation and filling of the cooling circuit and of the test chamber.

A mass percentage of carbon dioxide can be 0.35 to 0.63 when mixed with hexafluoroethane. If the refrigerant is a binary refrigerant mixture, it can behave completely azeotropically.

A mass percentage of carbon dioxide can be 0.62 to 0.78 when mixed with ethane. If the refrigerant is a binary refrigerant mixture, it can behave completely azeotropically.

A mass percentage of carbon dioxide can be 0.2 to 0.8, preferably 0.35 to 0.75, in particular preferably 0.4 to 0.7, when mixed with pentafluoroethane. A mass percentage of carbon dioxide of approx. 0.55 has proven particularly advantageous. If the refrigerant is a binary refrigerant mixture, it can behave completely zeotropically. A temperature glide can then be 14 K to 18 K (at 1 bar). In the case of a temperature glide of this kind, it may be provided for the cooling circuit to always be adapted to the refrigerant constructionally in terms of compressors, pipes, valves and control.

A mass percentage of carbon dioxide can be 0.2 to 0.8 and a mass percentage of pentafluoroethane can be 0.1 to 0.4, a mass percentage of carbon dioxide can preferably be 0.3 to 0.7 and a mass percentage of pentafluoroethane can preferably be 0.15 to 0.35, and, in particular preferably, a mass percentage of carbon dioxide can be 0.4 to 0.6 and a mass percentage of pentafluoroethane can be 0.2 to 0.6, when mixed with difluoromethane.

A mass percentage of carbon dioxide can be 0.16 to 0.97 when mixed with xenon. If the refrigerant is a binary refrigerant mixture, it can behave completely azeotropically.

Furthermore, it is advantageous if the refrigerant mixture contains a component of cyclopropane and a mass percentage of cyclopropane is in the range of 0.03 to 0.2. Moreover, the refrigerant mixture may contain additives for detecting leaks of the cooling circuit. The additives can be selected from the substances helium and hydrogen or from the substance group of hydrocarbons. Furthermore, odorous substances or substances or substance mixtures detectable in other ways can be used.

The mass percentages indicated can also be taken as amounts of substance (mol).

The temperature control device can have a heating device comprising a heater and another heat exchanger. The heating device can be an electrical resistance heater, for example, which heats the second heat exchanger in such a manner that the temperature in the test space can be increased via the second heat exchanger. If the first and second heat exchangers can be specifically controlled by means of a control unit to cool or heat the air circulated in the test space, a temperature in the temperature range of −80° C. to +180° C., preferably of −100° C. to +200° C., can be established within the test space by means of the temperature control device. Irrespective of the test material and of an operating state of the test material, a temporal temperature constancy of ±0.3 to ±0.5 K can be established in the test space during a test interval. The term test interval refers to a time segment of a full test period in which the test material is exposed to a substantially constant temperature or climatic condition. The other heat exchanger can be combined with the heat exchanger of the cooling circuit in such a manner that a joint heat exchanger body is formed, through which refrigerant can flow and which comprises heating elements of an electrical resistance heater.

The cooling device can have another cooling circuit comprising another refrigerant, another compressor, another condenser, and another expansion element, wherein the other cooling circuit can be coupled with the condenser of the cooling circuit by means of an internal heat exchanger.

Consequently, the cooling device can have circuits which are connected in series and which form what is known as a refrigeration cascade. The other cooling device and the other cooling circuit can cool the condenser of the first cooling circuit. Thus, it is possible to establish particularly low temperatures in the test space.

The condenser can be cooled by air or water or by another cooling fluid. In principle, the condenser can be cooled with any suitable fluid. The substantial point is that the thermal load occurring at the condenser is dissipated via cooling air or cooling water in such a manner that the refrigerant can condense until it is completely liquefied.

A pressure compensation device for the refrigerant may be disposed in the cooling circuit, allowing a pressure of <40 bar, preferably <35 bar to be established in the cooling circuit when a temperature of the refrigerant is a constant 20° C. throughout the cooling circuit. If another cooling circuit is present, it, too, can have a pressure compensation device of this kind. Since there may be relatively large temperature differences in the cooling circuit when in operation, it is particularly advantageous if the pressure compensation device can compensate them. In this way, very large temperature fluctuations and, thus, a change in volume of the refrigerant as a function of the respective coefficients of expansion of the refrigerant can be compensated via the pressure compensation device. In particular, it may be provided for the pressure compensation device to be configured such that the temperature control device is intrinsically safe when disconnected from the mains, i.e. that no standstill cooling of the refrigerant is required. Also, it is possible for the cooling circuit to be filled completely and ready-for-operation even prior to transport of the test chamber.

For instance, a refrigerant reservoir having a throttle or a capillary may be connected to a low-pressure side of the cooling circuit. The refrigerant reservoir can then form a pressure compensation device, which is a container, for example, in which refrigerant can accumulate. The container may be filled and emptied via the throttle, delayed pressure compensation taking place via the throttle as a function of a speed of condensation or evaporation of the coolant because of a retarded flow of the refrigerant via the throttle.

A gas cooler can be disposed in a high-pressure side of the cooling circuit downstream of the compressor and upstream of the condenser in the flow direction. In this way, it becomes possible to cool the gaseous refrigerant highly compressed by the compressor from a relatively high temperature level due to compression to a relatively low temperature level. The gas cooler allows condensation and liquefaction in the condenser to be ensured in the case of the refrigerant mixture used, in particular.

In the cooling circuit, a first bypass having at least another throttle or capillary can be formed, wherein said first bypass can bridge the compressor downstream of the compressor and upstream of the condenser in the flow direction, wherein a pressure difference between a high-pressure side and a low-pressure side of the cooling circuit can be compensated via the other throttle. The first bypass can additionally be equipped with an adjustable or controllable valve, such as a magnetic valve. Connecting the high-pressure side and the low-pressure side via the other throttle ensures that the highly compressed and gaseous refrigerant gradually flows from the high-pressure side to the low-pressure side of the cooling circuit when the installation is standing still. In this way, gradual pressure compensation between the high-pressure side and the low-pressure side is ensured even when the expansion element is closed. A cross-section of the other throttle can be dimensioned such that flow of the refrigerant from the high-pressure side to the low-pressure side has negligible impact on normal operation of the cooling device.

Furthermore, a second bypass having at least a first magnetic valve can be formed in the refrigeration circuit, wherein the second bypass can bypass the compressor downstream of the condenser and upstream of the expansion element in the flow direction, wherein refrigerant can be meterable via the first magnetic valve in such a manner that a suction-gas temperature and/or a suction-gas pressure of the refrigerant can be controlled upstream of the compressor on a low-pressure side of the cooling circuit. In this way, the compressor can be prevented from potentially overheating and thus becoming damaged, for example. Consequently, gaseous refrigerant located upstream of the compressor can be cooled via the second bypass by actuating the first magnetic valve and adding a metered amount of refrigerant that is still liquid. The first magnetic valve can be actuated by means of a controller which is coupled to a pressure and/or temperature sensor in the cooling circuit upstream of the compressor. It is particularly advantageous if a suction-gas temperature of ≤30° C. can be set via the second bypass. Also, the refrigerant can be metered such that an operating time of the compressor can be controlled. It is generally disadvantageous if the compressor is turned on and off repeatedly. A service life of a compressor can be prolonged if the compressor is in operation over longer periods of time. Refrigerant can be led past the compressor via the second bypass in order to delay automatic turning-off of the compressor and to prolong an operating time of the compressor.

In the refrigeration circuit, a third bypass having at least a second magnetic valve may also be formed, wherein the third bypass can bypass the expansion element upstream of the condenser in the flow direction, wherein refrigerant can be meterable via the second magnetic valve in such a manner that a suction-gas temperature and/or a suction-gas pressure of the refrigerant can be controlled upstream of the compressor on a low-pressure side of the cooling circuit. The third bypass can also have a throttle or capillary which delays the flow of refrigerant, for example.

The temperature control device can comprise a control unit having at least a pressure sensor and/or at least a temperature sensor in the cooling circuit, wherein magnetic valves can be configured to be actuatable by means of the control unit as a function of a measured temperature or pressure. Die control unit can comprise means for data processing which process the data sets of sensors and control the magnetic valves. In this case, a function of the cooling device can also be controlled via a corresponding computer program, for example, which can be configured for the refrigerant used. Furthermore, the control unit can signal a malfunction and, if necessary, initiate a shut-down of the test chamber in order to protect the test chamber or the test material from being damaged by critical or undesired states of operation of the test chamber.

Hereinafter, a preferred embodiment of the invention will be explained in more detail with reference to the accompanying drawing.

BRIEF DESCRIPTION OF THE DRAWING FIGURE

The FIGURE shows a schematic illustration of a test chamber 10 including a circuit diagram of a temperature control device 11. The test chamber 10 comprises a test space 12, only a section of which is illustrated here and which is temperature-insulated and delimited from the surroundings 14 by temperature-insulated walls 13. A fan 15 is disposed within the test space 12.

DETAILED DESCRIPTION OF THE INVENTION

The temperature control device 11 comprises a cooling device 16 having a cooling circuit 17 within which a refrigerant can circulate. The refrigerant is a nearly azeotropic refrigerant mixture of a mass percentage of carbon dioxide and a mass percentage of at least one of the components ethane, ethene, hexafluoroethane, pentafluoroethane, monofluoroethane, 1,1-difluoroethene, fluoromethane and/or propane and/or xenon, the refrigerant having a relative $CO_2$ equivalent of <10 with respect to 20 years. Furthermore, the cooling device 16 comprises a heat exchanger 18 disposed in the test space 12, a compressor 19, a condenser 20, and an expansion element 21. Moreover, another heat exchanger 22 of a heating device 23 of the temperature control device 11 is disposed in the test space 12. Thus, a temperature in a temperature range of −80° C. to +180° C. and also of −100° C. to +200° C. can be established within the test space 12 by means of the temperature control device 11. A line 24 shows a spatial separation between a machine room 25 and the test space 12.

The cooling circuit 17 has a high-pressure side 26, which extends from the compressor 19 to the expansion element 21 in the flow direction of the refrigerant, and a low-pressure side 27, which extends from the expansion element 21 to the compressor 19. Downstream of the compressor 19, an oil separator 28 and a temperature sensor 29 are disposed in the cooling circuit 17. Further down the cooling circuit 17, a pressure sensor 30 is disposed downstream of the oil separator 28 and a gas cooler 31 is disposed downstream of the pressure sensor 30. In a pipe section 32 from the compressor 19 to the gas cooler 31, the refrigerant is gaseous and has a relatively high temperature. The refrigerant compressed by the compressor 19 flows in the cooling circuit 17 toward the condenser 20, which, in this case, is cooled by another cooling circuit 33 in such a manner that the gaseous refrigerant is liquefied in the condenser 20. In the flow direction of the refrigerant in the cooling circuit 17, the condenser 20 is followed by a shut-off valve 34 and by a filter dryer 35 for filtering and drying the refrigerant. Thereafter in the cooling circuit 17, the refrigerant reaches a magnetic valve 36 and the expansion element 21, which is self-controlled by means of a pressurized pipe section 37 and a temperature sensor 38. In a pipe section 39 of the cooling circuit 17, the refrigerant is thus in the liquid state. The expansion element 21, which is disposed in a feed line 40 with respect to the heat exchanger 18 and the compressor 19, is consequently controlled via the pipe section 37 and the temperature sensor 38, which are connected to a return line 41 of the cooling circuit 17. By the expansion of the refrigerant downstream of the expansion element 21, the heat exchanger 18 is cooled, the refrigerant transitioning into the gaseous state and being led to the compressor 19 by way of the return line 41 and a pipe section 42.

Furthermore, a first bypass 43 having a throttle 44 and a shut-off valve 45 is disposed in the cooling circuit 17. The first bypass 43 bypasses the compressor 19, causing gradual pressure compensation between the high-pressure side 26 and the low-pressure side 27 via the throttle 44 when the compressor 19 is standing still.

A second bypass 46 having a throttle 47 and a magnetic valve 48 is connected to the first bypass 43 and also bypasses the compressor 19 upstream of the condenser 20 and downstream of the gas cooler 31. Via the magnetic valve 28, refrigerant can flow from the high-pressure side 26 to the low-pressure side 27 and can be metered such that a suction-gas temperature and a suction-gas pressure in the pipe section 42 up-stream of the compressor 19 are in the optimum range for the refrigerant. The first bypass 43 thus serves to let cold expanded gaseous refrigerant flow through when the installation is standing still and thus ensures pressure compensation. The second bypass 46 serves to let relatively hot gaseous refrigerant to flow into the return line 41 so as to control a suction-gas temperature upstream of the compressor 19. A suction-gas temperature may be ≤30° C. in this case.

A third bypass 49 engages with the cooling circuit 17 downstream of the condenser 20 and of the filter dryer 35 in such a manner that the expansion element 21 is bypassed, wherein refrigerant can be metered from the high-pressure side 26 to the low-pressure side 27 via a throttle 50 and a magnetic valve 51 in such a manner that a suction-gas temperature and a suction-gas pressure of the refrigerant can be controlled upstream of the compressor 19 on the low-pressure side 27. Contrary to the second bypass 46, the refrigerant added via the third bypass 49 is liquid, which allows in particular the suction-gas temperature in the return line 41 to be lowered under the control of the magnetic valve 51.

The other cooling circuit 33 comprises another compressor 52, another condenser 53, and another expansion element 54, and an internal heat exchanger 55, by means of which the condenser 20 is cooled.

The invention claimed is:
1. A test chamber (10) for conditioning air, comprising a test space (12) which serves to receive test material and which can be closed off from the surroundings and which is temperature-insulated, and a temperature control device (11) for controlling the temperature of the test space, the temperature control device allowing a temperature in a temperature range of 80° C. to +180° C., to be established within the test space, the temperature control device having a cooling device (16) comprising a cooling circuit (17) with a refrigerant, a heat exchanger (18) disposed in the test space, a compressor (19), a condenser (20), and an expansion element (21), wherein the refrigerant is an azeotropic or zeotropic refrigerant mixture of a mass percentage of carbon dioxide of 0.2 to 0.8 and a mass percentage of pentafluoroethane of 0.1 to 0.4, the refrigerant having a relative $CO_2$ equivalent of <3000, with respect to 20 years.

2. The test chamber according to claim 1, wherein the refrigerant is nonflammable.

3. The test chamber according to claim 1, wherein the refrigerant is soluble in refrigerator oil.

4. The test chamber according to claim 1, wherein the refrigerant has a temperature glide of equal to or less than 20 K.

5. The test chamber according to claim 1, wherein the mass percentage of carbon dioxide is 0.3 to 0.7 and the mass percentage of pentafluoroethane is 0.15 to 0.35.

6. The test chamber according to claim 1, wherein the temperature control device (11) has a heating device (23) comprising a heater and another heat exchanger (22) disposed in the test space (12).

7. The test chamber according to claim 1, wherein the cooling device (16) has another cooling circuit (33) comprising another refrigerant, another compressor (52), another condenser (53), and another expansion element (54), the other cooling circuit being coupled with the condenser (20) of the cooling circuit (17) via an internal heat exchanger (55).

8. The test chamber according to claim 1, wherein the condenser (20, 53) is cooled by air or by water or by another cooling fluid.

9. The test chamber according to claim 1, wherein a pressure compensation device for the refrigerant is disposed in the cooling circuit (17), a pressure of <40 bar, being established in the cooling circuit when the temperature of the refrigerant is a constant 20° C. throughout the cooling circuit.

10. The test chamber according to claim 1, wherein a refrigerant reservoir having a throttle is connected to a low-pressure side (27) of the cooling circuit (17).

11. The test chamber according to claim 1, wherein a high-pressure side (26) of the cooling circuit (17), a gas cooler (31) is disposed downstream of the compressor (19) and upstream of the condenser (20) in the flow direction.

12. The test chamber according to claim 1, wherein a first bypass (43) having at least another throttle (44) is formed in the cooling circuit (17), said first bypass bypassing the compressor (19) downstream of the compressor and upstream of the condenser (20) in the flow direction, wherein a pressure difference between a high-pressure side (26) and a low-pressure side (27) of the cooling circuit can be compensated by means of the other throttle.

13. The test chamber according to claim 1, wherein a second bypass (46) having at least a first magnetic valve (48) is formed in the cooling circuit (17), the second bypass bypassing the compressor (19) upstream of the condenser (20) in the flow direction, the first magnetic valve allowing refrigerant to be metered in such a manner that a suction-gas temperature or a suction-gas pressure of the refrigerant can be controlled upstream of the compressor on a low-pressure side (27) of the cooling circuit.

14. The test chamber according to claim 1, wherein a third bypass (49) having at least a second magnetic valve (51) is formed in the cooling circuit (17), the third bypass bypassing the expansion element (21) downstream of the expansion element (20) and upstream of the expansion element in the flow direction, the second magnet valve allowing refrigerant to be metered in such a manner that a suction-gas temperature or a suction-gas pressure of the refrigerant can be controlled upstream of the compressor (19) on a low-pressure side (27) of the cooling circuit.

15. The test chamber according to claim 13, wherein the temperature control device (11) comprises a control unit having at least a pressure sensor (30) or at least a temperature sensor (29, 38) in the cooling circuit (17), wherein magnetic valves (36, 48, 51) can be actuated by means of the control unit as a function of a measured temperature and pressure.

16. A test chamber (10) for conditioning air, comprising a test space (12) which serves to receive test material and which can be closed off from the surroundings and which is temperature-insulated, and a temperature control device (11) for controlling the temperature of the test space, the temperature control device allowing a temperature in a temperature range of 80° C. to +180° C., to be established within the test space, the temperature control device having a cooling device (16) comprising a cooling circuit (17) with a refrigerant, a heat exchanger (18) disposed in the test space, a compressor (19), a condenser (20), and an expansion element (21), wherein the refrigerant is an azeotropic or zeotropic refrigerant mixture of a mass percentage of carbon dioxide of 0.09 to 0.45 and ethene, the refrigerant having a relative $CO_2$ equivalent of <3000, with respect to 20 years.

17. A test chamber (10) for conditioning air, comprising a test space (12) which serves to receive test material and which can be closed off from the surroundings and which is temperature-insulated, and a temperature control device (11) for controlling the temperature of the test space, the temperature control device allowing a temperature in a temperature range of −80° C. to +180° C., to be established within the test space, the temperature control device having a cooling device (16) comprising a cooling circuit (17) with a refrigerant, a heat exchanger (18) disposed in the test space, a compressor (19), a condenser (20), and an expansion element (21), wherein the refrigerant is an azeotropic or zeotropic refrigerant mixture of a mass percentage of carbon dioxide is 0.62 to 0.78 and ethane, the refrigerant having a relative $CO_2$ equivalent of <3000, with respect to 20 years.

18. A test chamber (10) for conditioning air, comprising a test space (12) which serves to receive test material and which can be closed off from the surroundings and which is temperature-insulated, and a temperature control device (11) for controlling the temperature of the test space, the temperature control device allowing a temperature in a temperature range of −80° C. to +180° C., to be established within the test space, the temperature control device having a cooling device (16) comprising a cooling circuit (17) with a refrigerant, a heat exchanger (18) disposed in the test space, a compressor (19), a condenser (20), and an expansion element (21), wherein the refrigerant is an azeotropic or zeotropic refrigerant mixture of a mass percentage of carbon dioxide is 0.2 to 0.8 and pentafluoroethane, the refrigerant having a relative $CO_2$ equivalent of <3000, with respect to 20 years.

19. A test chamber (10) for conditioning air, comprising a test space (12) which serves to receive test material and which can be closed off from the surroundings and which is temperature-insulated, and a temperature control device (11) for controlling the temperature of the test space, the temperature control device allowing a temperature in a temperature range of −80° C. to +180° C., to be established within the test space, the temperature control device having a cooling device (16) comprising a cooling circuit (17) with a refrigerant, a heat exchanger (18) disposed in the test space, a compressor (19), a condenser (20), and an expansion element (21), wherein the refrigerant is an azeotropic or zeotropic refrigerant mixture of a mass percentage of carbon dioxide and a mass percentage of at least one of the components ethane, ethene, hexafluoroethane, pentafluoroethane, monofluoroethane, 1,1-di-fluoroethene, fluoromethane or propane or xenon, the refrigerant having a relative $CO_2$ equivalent of <3000, with respect to 20 years, wherein a pressure compensation device for the refrigerant is disposed in the cooling circuit (17), a pressure of <40 bar being established in the cooling circuit when the temperature of the refrigerant is a constant 20° C. throughout the cooling circuit.

20. A test chamber (10) for conditioning air, comprising a test space (12) which serves to receive test material and which can be closed off from the surroundings and which is temperature-insulated, and a temperature control device (11) for controlling the temperature of the test space, the temperature control device allowing a temperature in a temperature range of −80° C. to +180° C., to be established within the test space, the temperature control device having a cooling device (16) comprising a cooling circuit (17) with a refrigerant, a heat exchanger (18) disposed in the test space, a compressor (19), a condenser (20), and an expansion element (21), wherein the refrigerant is an azeotropic or zeotropic refrigerant mixture of a mass percentage of carbon dioxide and a mass percentage of at least one of the components ethane, ethene, hexafluoroethane, pentafluoroethane, monofluoroethane, 1,1-di-fluoroethene, fluoromethane or propane or xenon, the refrigerant having a relative $CO_2$ equivalent of <3000, with respect to 20 years, wherein a first bypass (43) having at least another throttle (44) is formed in the cooling circuit (17), said first bypass bypassing the compressor (19) downstream of the compressor and upstream of the condenser (20) in the flow direction, wherein a pressure difference between a high-pressure side (26) and a low-pressure side (27) of the cooling circuit can be compensated by means of the other throttle.

21. A test chamber (10) for conditioning air, comprising a test space (12) which serves to receive test material and which can be closed off from the surroundings and which is temperature-insulated, and a temperature control device (11) for controlling the temperature of the test space, the temperature control device allowing a temperature in a temperature range of −80° C. to +180° C., to be established within the test space, the temperature control device having a cooling device (16) comprising a cooling circuit (17) with a refrigerant, a heat exchanger (18) disposed in the test space, a compressor (19), a condenser (20), and an expansion element (21), wherein the refrigerant is an azeotropic or zeotropic refrigerant mixture of a mass percentage of carbon dioxide of 0.4 to 0.6, a mass percentage of pentafluoroethane is 0.2 to 0.6, and difluoromethane.

* * * * *

UNITED STATES PATENT AND TRADEMARK OFFICE
CERTIFICATE OF CORRECTION

PATENT NO. : 10,921,029 B2  
APPLICATION NO. : 16/082328  
DATED : February 16, 2021  
INVENTOR(S) : Christian Haack et al.

Page 1 of 1

It is certified that error appears in the above-identified patent and that said Letters Patent is hereby corrected as shown below:

In the Claims

Column 8, Claim 1, Line 63 - Please replace 80 °C. with --- –80° C. ---

Column 10, Claim 16, Line 17 - Please replace 80 °C. with --- –80° C. ---

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*